(12) United States Patent
Grigoriev et al.

(10) Patent No.: US 8,301,838 B2
(45) Date of Patent: Oct. 30, 2012

(54) METHOD AND APPARATUS FOR PROVIDING AN APPLICATION-LEVEL CACHE WITH A LOCKED REGION AND A FLOATING REGION

(75) Inventors: Nikolai Grigoriev, Brossard (CA); Sylvain Legault, Pierrefonds (CA)

(73) Assignee: Nokia Corporation, Espoo (FI)

( * ) Notice: Subject to any disclaimer, the term of this patent is extended or adjusted under 35 U.S.C. 154(b) by 407 days.

(21) Appl. No.: 12/612,517

(22) Filed: Nov. 4, 2009

(65) Prior Publication Data

US 2011/0107033 A1    May 5, 2011

(51) Int. Cl.
*G06F 12/00*    (2006.01)
*G06F 13/00*    (2006.01)

(52) U.S. Cl. ........ 711/129; 711/144; 711/133; 711/125; 711/138

(58) Field of Classification Search .......... 711/129, 711/144, 133, 125, 138
See application file for complete search history.

(56) References Cited

U.S. PATENT DOCUMENTS

| | | | |
|---|---|---|---|
| 5,353,425 A * | 10/1994 | Malamy et al. | 711/144 |
| 5,493,667 A * | 2/1996 | Huck et al. | 711/125 |
| 5,983,329 A * | 11/1999 | Thaler et al. | 711/163 |
| 6,044,478 A * | 3/2000 | Green | 714/42 |
| 6,115,703 A | 9/2000 | Bireley et al. | |
| 6,772,299 B2 | 8/2004 | McWilliams et al. | |
| 6,868,472 B1 * | 3/2005 | Miyake et al. | 711/3 |
| 7,650,466 B2 * | 1/2010 | Stempel et al. | 711/129 |
| 7,827,360 B2 * | 11/2010 | Rahman et al. | 711/141 |
| 2003/0018855 A1 * | 1/2003 | McWilliams et al. | 711/128 |
| 2007/0067574 A1 * | 3/2007 | Stempel et al. | 711/129 |
| 2007/0150647 A1 | 6/2007 | Shin et al. | |
| 2007/0150654 A1 | 6/2007 | Shin et al. | |
| 2007/0204121 A1 * | 8/2007 | O'Connor et al. | 711/163 |
| 2008/0177954 A1 | 7/2008 | Lee | |
| 2009/0083497 A1 * | 3/2009 | Yu et al. | 711/144 |
| 2010/0030964 A1 * | 2/2010 | Aciicmez et al. | 711/119 |

FOREIGN PATENT DOCUMENTS

KR    20030020095 A    3/2003

* cited by examiner

*Primary Examiner* — Hong Kim
(74) *Attorney, Agent, or Firm* — Ditthavong Mori & Steiner, P.C.

(57) ABSTRACT

An approach is provided for providing an application-level cache. A caching application configures at least one memory of a mobile terminal into an application-level cache with a locked region and a floating region. The caching application then causes, at least in part, actions that result in caching, into each of the locked region and the floating region, of data items that are anticipated to be requested via an application of the mobile terminal.

20 Claims, 14 Drawing Sheets

Put First()

Put Last()

METHOD AND APPARATUS FOR PROVIDING AN APPLICATION-LEVEL CACHE WITH A LOCKED REGION AND A FLOATING REGION

BACKGROUND

Service providers (e.g., wireless, cellular, Internet, content, social network, etc.) and device manufacturers are continually challenged to deliver value and convenience to consumers by, for example, offering efficient access and traversing speeds for emails, media content sharing, etc. However, most mobile devices have limited cache memory and/or small screens such that the user can only view limited amount of data on the screen. For example, a mobile device may only be able to display a subset of available email messages at any one time because the display area is limited or the available memory for caching the messages is limited. In either case, to view a next subset of email messages, the mobile would have to retrieve those messages from, for instance, an external mail server, which takes time.

SOME EXAMPLE EMBODIMENTS

Therefore, there is a need for an approach for providing an application-level cache.

According to one embodiment, a method comprises configuring at least one memory of a mobile terminal into an application-level cache with a locked region and a floating region. The method also comprises causing, at least in part, actions that result in caching, into each of the locked region and the floating region, of data items that are anticipated to be requested via an application of the mobile terminal.

According to another embodiment, an apparatus comprising at least one processor, and at least one memory including computer program code, the at least one memory and the computer program code configured to, with the at least one processor, cause, at least in part, the apparatus to configure at least one memory of a mobile terminal into an application-level cache with a locked region and a floating region. The apparatus is also caused to cause, at least in part, actions that result in caching, into each of the locked region and the floating region, of data items that are anticipated to be requested via an application of the mobile terminal.

According to another embodiment, a computer-readable storage medium carrying one or more sequences of one or more instructions which, when executed by one or more processors, cause, at least in part, an apparatus to configure at least one memory of a mobile terminal into an application-level cache with a locked region and a floating region. The apparatus is also caused to cause, at least in part, actions that result in caching, into each of the locked region and the floating region, of data items that are anticipated to be requested via an application of the mobile terminal.

According to another embodiment, an apparatus comprises means for configuring at least one memory of a mobile terminal into an application-level cache with a locked region and a floating region. The apparatus also comprises means for causing, at least in part, actions that result in caching, into each of the locked region and the floating region, of data items that are anticipated to be requested via an application of the mobile terminal.

Still other aspects, features, and advantages of the invention are readily apparent from the following detailed description, simply by illustrating a number of particular embodiments and implementations, including the best mode contemplated for carrying out the invention. The invention is also capable of other and different embodiments, and its several details can be modified in various obvious respects, all without departing from the spirit and scope of the invention. Accordingly, the drawings and description are to be regarded as illustrative in nature, and not as restrictive.

BRIEF DESCRIPTION OF THE DRAWINGS

The embodiments of the invention are illustrated by way of example, and not by way of limitation, in the figures of the accompanying drawings.

DESCRIPTION OF SOME EMBODIMENTS

Examples of a method, apparatus, and computer program for providing an application-level cache are disclosed. In the following description, for the purposes of explanation, numerous specific details are set forth in order to provide a thorough understanding of the embodiments of the invention. It is apparent, however, to one skilled in the art that the embodiments of the invention may be practiced without these specific details or with an equivalent arrangement. In other instances, well-known structures and devices are shown in block diagram form in order to avoid unnecessarily obscuring the embodiments of the invention.

As used herein, the term Least Recently Used (LRU) eviction policy refers to replacing a cache data item, a cache line, or a cache group that is last referenced in the most distant past, when a new data item, line or cache group is loaded into the cache. At the data level, cache memory is situated between a processor and a main memory, accessed by the processor much faster than the main memory being accessed for data and instruction code currently used by the processor, to significantly reduce waiting states. If a word in a block of the main memory is read, that block is assumed to be used by the processor thus transferred to one of the lines of the cache and assigned with a tag as an identifier. If a word in a block of the main memory is read, that block is assumed to be used by the processor thus transferred to one of the lines of the cache and assigned with a tag as an identifier. At an application level, cache memory is situated between a processor within a mobile device and a main memory of an external server, and accessed by the processor much faster than the main memory being accessed for naturally ordered data (e.g., emails, news or blog threads, etc.) to significantly reduce waiting states.

For example, if an email is read from the main memory, a group of neighboring messages is assumed to be used by the processor and thus transferred to the cache in the mobile device and assigned with an index as an identifier. The cached message groups are further mapped into fixed slots as a cache group in the mobile device.

Although various embodiments are described with respect to email boxes containing the message groups and contents of the message groups, it is contemplated that the approach described herein may be used with other application level ordered data structures, such as discussion forums, blog postings, news feeds, etc. that have a natural order (e.g., per time, per subject, etc.).

Figure 1:
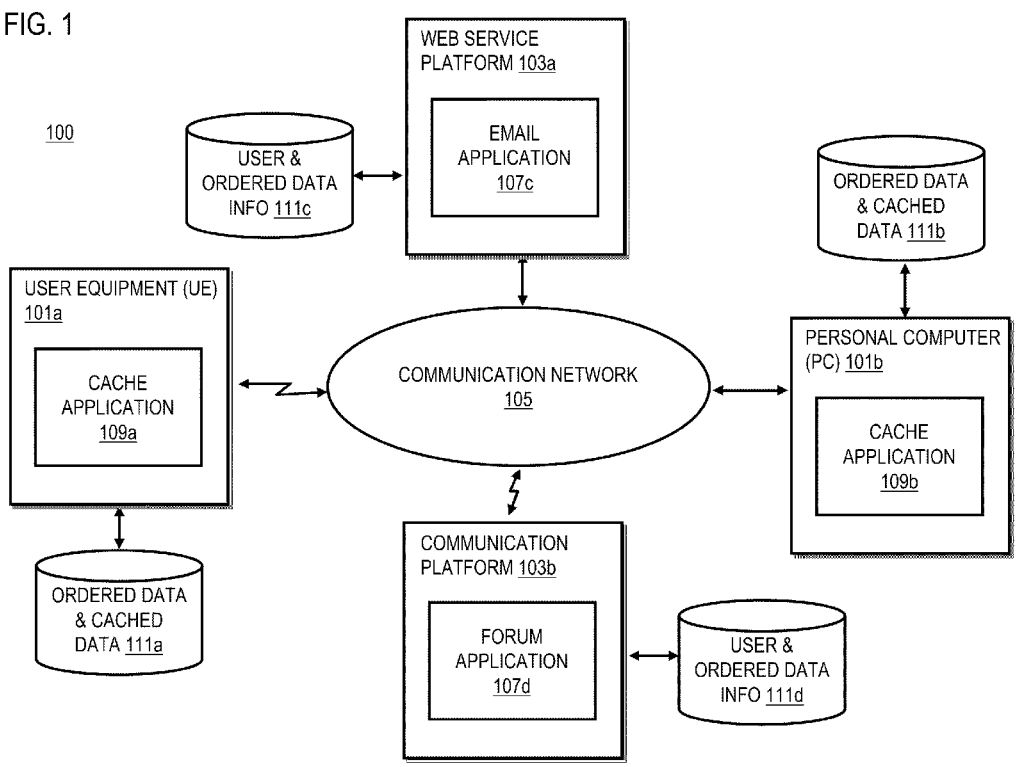
FIG. 1 is a diagram of a system capable of providing an application-level cache, according to one embodiment.

FIG. 1 is a diagram of a system capable of providing an application-level cache, according to one embodiment. Typically, mobile device applications dealing with application data access (e.g., messaging) allow the user to access a relatively big collection of data located on a remote server, such as emails in the mailbox, posts in blogs or news feeds, etc. By way of example, the user accesses email items in Inbox by scrolling a list per page. At the first level of the user interface, the user sees only the basic information of an email message (such as author name, date, etc) and optionally a small piece of the content. At the second level, the user sees the content of the message. In a more complicated case, such as a discussion forum, blog, etc, the user might see the list of topics (threads) at the first level, then the list of messages in the selected thread at the second level, and the message itself at the third level.

Traditionally, mobile devices usually avoid downloading the entire collection of data, and instead download and display only a portion of the data collection to the user. In particular, mobile devices download a portion of the data from a server, store the portion temporarily in a cache, and then display the portion. Generally, however, this type of cache is at the data-level, not at an application-level or as a part of the data model. This type of data-level cache is a flat collection of different data items addressed by unique keys. The relevant data model organizes the related data items, i.e., cache nodes (e.g. emails in a mailbox), in a certain natural order (e.g., per date, per sender, etc.). When a requested data item exists in the data model and in the cache, the application fetches it from the cache ("cache hit"). When a requested data item exists in the data model but not in the cache (either never downloaded or recently evicted), the application has to download the data item from the server ("cache miss"). The more efficient the data-level caching is, the less data the application has to download from the server. Less frequent downloads lead to better user experience, since the user does not have to wait for the server to respond.

When the application accesses the same data item again within a time period, the application uses the cached copy instead of downloading it from the server again, if the item has not been changed on the server. The cached data items usually get evicted from the cache at some point in time to allow caching of new items. Different policies (e.g., LRU) are used to evict the data items from the cache to free up space for the new data items.

The cache capacity of a mobile device is always limited due to its manufacturing cost and how the cache is configured. The mobile communication protocol typically allows the mobile device application (e.g., an email messaging application) to access the data items page-by-page starting from the most recent emails. The cache is "paged" such that the size of the user interface (UI) "page" and the protocol "page" do not affect the cache parameters. When a user tries to search for emails over the email box or to navigate down the email box, it usually takes a long time for the server to respond, since a lot of data items involved are not cached. In addition, the LRU eviction policy evicts the top-most message groups while navigating down the mailbox, such that the user cannot navigate back quickly to the top/most recent message page.

To address these problems, a system 100 of FIG. 1 introduces the capability to provide an application-level cache. The system 100 enables a cache architecture that supports a mobile device application to access data collection such as email threads, social network messages, blog posts etc. with faster user experience and reduce the number of network interactions (saves network traffic bandwidth). By way of example, the cache architecture is applied to the following data structures: email boxes containing the message groups, contents of the message groups, news feeds, etc. The system 100 implements this cache architecture that mirrors the cache eviction policy with usage patterns (i.e. how the application accesses the data collection), and deploys the cache architecture as a data model to eliminate or reduce additional memory structures. This cache architecture allows the logic of the application to navigate freely up/down the email box and quickly navigate back to the most recent messages.

As shown in FIG. 1, the system 100 comprises a user equipment (UE) 101a connected to a personal computer 101b, a web service platform 103a, and a communication platform 103b via a communication network 105. Each of the UE 101a and the personal computer 101b has a cache application 109 and a database 111 for storing ordered data and cached data. The web service platform 103a has an email application 107c and a database 111c for storing user and ordered data information. The communication platform 103b has a forum application 107d and a database 111d for storing user and ordered data information By way of example, the communication network 105 of system 100 includes one or more networks such as a data network (not shown), a wireless network (not shown), a telephony network (not shown), or any combination thereof. It is contemplated that the data network may be any local area network (LAN), metropolitan area network (MAN), wide area network (WAN), a public data network (e.g., the Internet), or any other suitable packet-switched network, such as a commercially owned, proprietary packet-switched network, e.g., a proprietary cable or fiber-optic network. In addition, the wireless network may be, for example, a cellular network and may employ various technologies including enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., worldwide interoperability for microwave access (WiMAX), Long Term Evolution (LTE) networks, code division multiple access (CDMA), wideband code division multiple access (WCDMA), wireless fidelity (WiFi), satellite, mobile ad-hoc network (MANET), and the like.

The UE 101a is any type of mobile terminal, fixed terminal, or portable terminal including a mobile handset, station, unit, device, multimedia computer, multimedia tablet, Internet node, communicator, desktop computer, laptop computer, Personal Digital Assistants (PDAs), or any combination thereof. It is also contemplated that the UE 101a can support any type of interface to the user (such as "wearable" circuitry, etc.).

By way of example, the UE 101a, the personal computer 101b, the web service platform 103a, and the communication platform 103b communicate with each other and other components of the communication network 105 using well known, new or still developing protocols. In this context, a protocol includes a set of rules defining how the network nodes within the communication network 105 interact with each other based on information sent over the communication links. The protocols are effective at different layers of operation within each node, from generating and receiving physical signals of various types, to selecting a link for transferring those signals, to the format of information indicated by those signals, to identifying which software application executing on a computer system sends or receives the information. The conceptually different layers of protocols for exchanging information over a network are described in the Open Systems Interconnection (OSI) Reference Model.

Communications between the network nodes are typically effected by exchanging discrete packets of data. Each packet typically comprises (1) header information associated with a particular protocol, and (2) payload information that follows the header information and contains information that may be processed independently of that particular protocol. In some protocols, the packet includes (3) trailer information following the payload and indicating the end of the payload information. The header includes information such as the source of the packet, its destination, the length of the payload, and other properties used by the protocol. Often, the data in the payload for the particular protocol includes a header and payload for a different protocol associated with a different, higher layer of the OSI Reference Model. The header for a particular protocol typically indicates a type for the next protocol contained in its payload. The higher layer protocol is to be encapsulated in the lower layer protocol. The headers included in a packet traversing multiple heterogeneous networks, such as the Internet, typically include a physical (layer 1) header, a data-link (layer 2) header, an internetwork (layer 3) header and a transport (layer 4) header, and various application headers (layer 5, layer 6 and layer 7) as defined by the OSI Reference Model.

Figure 2:
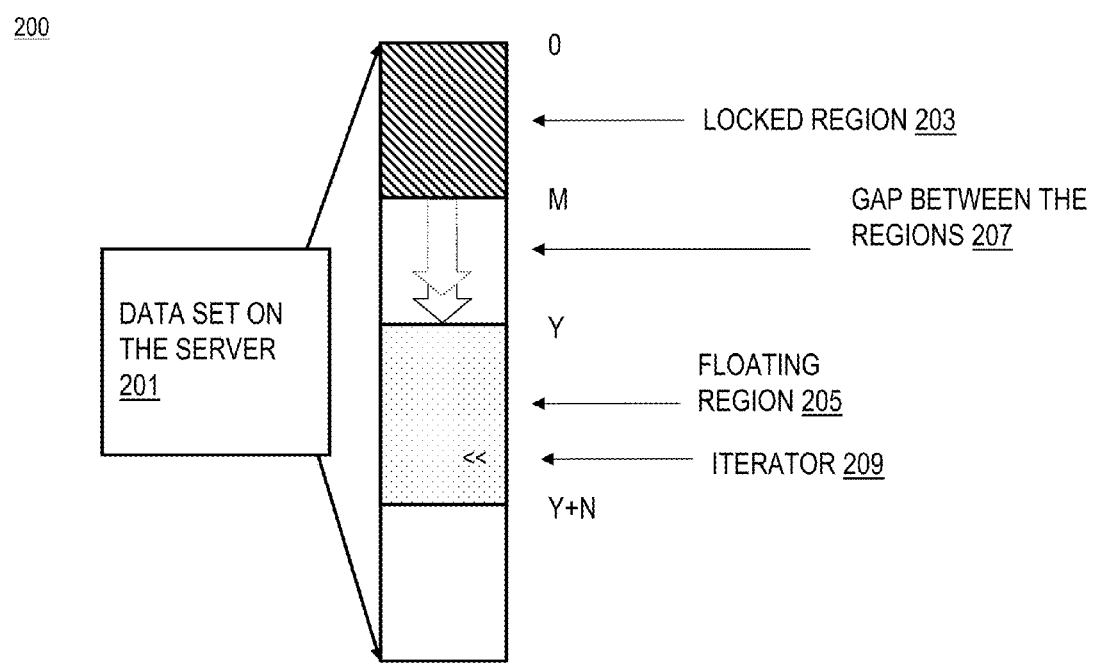
FIG. 2 is a diagram of an application-level cache architecture, according to one embodiment.

FIG. 2 is a diagram of an application level cache architecture, according to one embodiment. The cache architecture provides an application level cache 200 with ordered data retrieved from a data set 201 in a server (not shown). The cache may be configured in random access memory (RAM), or in flash memory (available after the application restarts), or a combination thereof. By way of example, the cache 200 is organized to include (1) a locked (top-most) region 203 whose data items are prevented from being evicted, and (2) a floating (below) region 205 that allows the application logic to navigate down with a floating data "window" endlessly for a partial view of the data residing in, for instance, the server. The content of the locked region 203 remains mostly unchanged, while new data items are added into the end of the floating region 205. The addition of new data items eventually causes the floating region to "detach" from the locked region and to evict data items in a gap 207 between the two regions.

For example, the locked region 203 holds up to a fixed number ("M") of cache nodes. The floating region 205 of an arbitrary size (e.g., "N" number of cache nodes) may move down from the end of the locked region 203, thus detaches from the locked region 203 (as an application logic moves down through the collection of items). By way of example, the floating region 205 detaches from the locked region 203 when the data cached in the floating region 205 is no longer sequentially or directly ordered from the data cached in the locked region 203. In other words, there is a gap 207 in the ordered data between the floating region 205 and the locked region 203. Once the floating region 205 is detached from the locked region 203 (e.g., as a session from data item "Y" to a data item "Y+N" in FIG. 2), the gap 207 is generated between the two regions. The application logic either navigates within the floating region 205, or switches to the locked region 203 by explicitly requesting to "jump" (i.e., navigate up) into the locked region 203. The application logic can endlessly navigate down the list to partially view data of the data set 201 in the server. An access to the floating region 205 results in an exception so the application logic can revert to the locked region 203 from the floating region 205.

The cache architecture allows adding a data object/item into the beginning or to the end of the cache along without duplicate keys, so as to virtually map unlimited amount of data of an external source (e.g., a server) therein. In one embodiment, a predetermined maximum number of data items is available for viewing at the mobile device at any time. The cache is used as a data model on the client side that does not download all the data items from the server side (due to capacity limits), to provide a partial view of the server-side data model.

As the application logic navigates further within the ordered data items in the data set 201, the application logic may not be able to go back to the very beginning of the item list 201 (i.e., to navigate up through the floating region 205 towards the beginning of the locked region 203), since the application logic may lose track of the window movements due to cache updates during the navigation. In this case, the system 100 can expose the internal cache structures to the application logic so that the logic can reposition itself within the data set 201 if the logic loses track of the window movements. If the cache 200 decides that the data items in the floating region 205 are no longer needed, the cache 200 flushes out the data items in the floating region to revert back to the beginning of the locked region 203.

The system 100 further provides an iterator 209 that allows the application logic to traverse/navigate through all the items of the data model at the server side, regardless of its specific implementation. The iterator 209 usually holds the index of a current node to seamlessly continue navigation. The iterator 209 is lenient enough to survive cache updates during the navigation. Using of the iterator 209 keeps the UI from noticing the changes/updates happening to the underlying data (such as adding new data items or discarding old data items), when the changes to the underlying data do not affect the current node. By way of example, if the current node is at position #20 and a change occurs at position #10, the iterator is not affected. However, if all nodes between position #0 and position #30 are erased, the iterator will be affected and the UI takes certain action (e.g., initiate display of new data) when the user moves the current node. By analogy, the UI can query the iterator to detect the changes, but the UI is not forced to reflect the changes immediately. For example, when the iterator is at the top-most position in the cache, the UI is free to query the iterator to find out if new (e.g. more recent) items have been added "above" the current position.

The iterator 209 fast-fails, if a requested cached data item is not available in the cache (e.g., the requested data it was never downloaded or flushed). When fast-failing, the iterator 209 stops its normal operation (without attempting to continue a possibly-flawed process) and informs the system 100 that it cannot track the requested data item.

If the cache is suddenly populated with a lot of new data items, the node corresponding to the current position referred to by the iterator may be evicted from the cache. Consequently, accessing the cache using the index of the current position will result in a cache miss causing the system 100 to detect that the iterator has lost the track of the current node and that the iterator can no longer offer the sequential up/down navigation. The system 100 may wait for a cache miss and requests the application for a full refresh of the floating region. In another embodiment, the iterator implements a "best effort" approach to adjust the iterator's position to point to the closest element possible.

Figure 3:
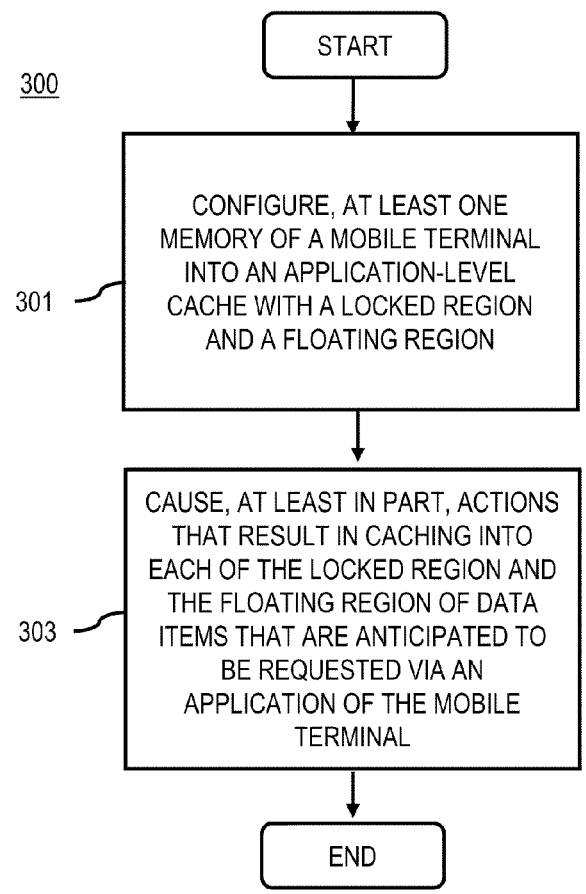
FIG. 3 is a flowchart of a process for providing an application cache, according to one embodiment.

FIG. 3 is a flowchart of a process 300 for providing an application cache, according to one embodiment. In one embodiment, the cache application 109a performs the process 300 and is implemented in, for instance, a chip set including a processor and a memory as shown FIG. 15. In step 301, the cache application 109a configures at least one memory of a mobile terminal into an application-level cache with a locked region and a floating region. The memory may be a RAM, a flash memory, an external card flash memory, or any other type of a low-power memory. The flash memory can be multimedia cards (MMC), a secure digital (SD) flash memory, MEMS (micro-electro-mechanical system) flash memory or other flash based memory cards.

In addition, the cache application 109a causes, at least in part, actions that result in caching into each of the locked region and the floating region of data items that are anticipated to be requested via an application of the mobile terminal (Step 303). By way of example, the locked and floating regions are filled as a result of a user action, such as opening an Inbox of an email application and navigating through the Inbox. The server may reside at the web service platform 103a, or the communication platform 103b, or any other online platforms.

Figure 4:
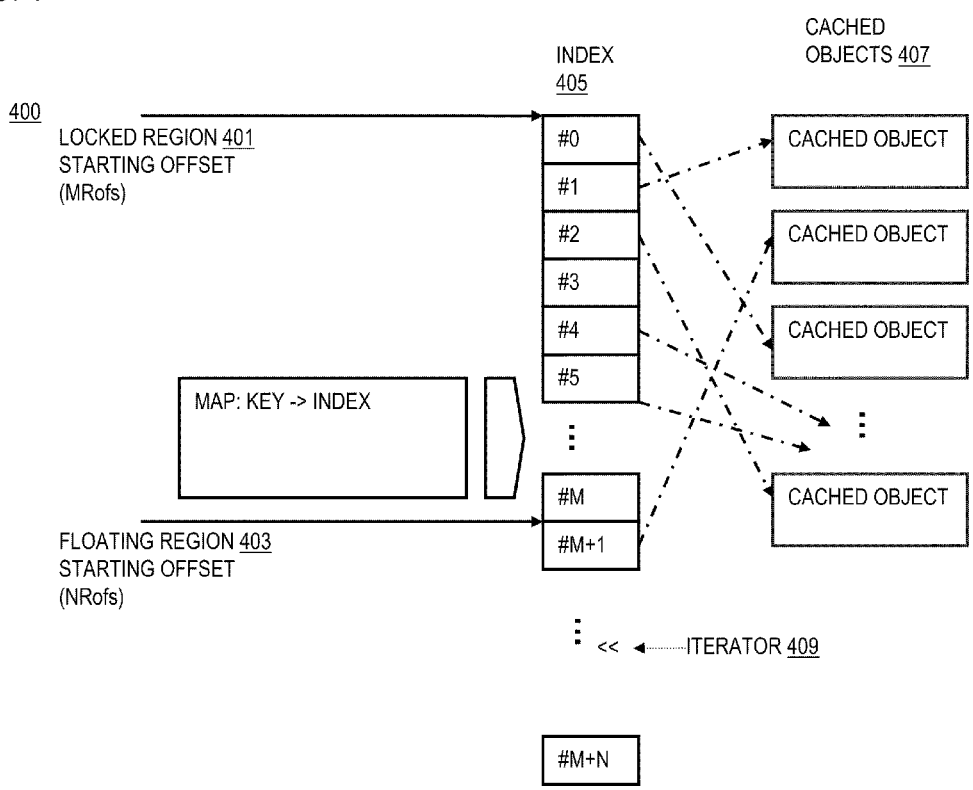
FIG. 4 is a diagram of a physical organization of the application-level cache, according to one embodiment.

FIG. 4 is a diagram of a physical organization of the application-level cache, according to one embodiment. A contiguous array of a size M+N of index are created for the same number of cached objects (i.e., data items), where M is the size of the locked region 401 and N is the size of the floating region 403. This array of indexes 405 are mapped to the cached objects 407 located in a heap via the objects' unique keys. A heap is a specialized tree-based data structure that satisfies the heap property: if B is a child node of A, then key (A)≧key (B). This implies that a data object with the greatest key is always in the root node. Each of the data item/object sent from the server comes with its unique key (e.g., a message ID) which is a stream of 20-30 characters and cannot be sorted. The cache application 109a maps the keys of the cached objects 407 with the indexes #1 to #M in the locked region 401 and with the indexes #M+1 to #N in the floating region 403. Therefore, the cached data items can be updated by modifying the indexes, while minimizing the physical movement of the cached objects in the cache. An object/node, once added to the cache (e.g., to the top or to the bottom of the locked or floating region) is assigned an index based on the index of a preceding object/node and the direction of insertion. The assigned index does not change unless the node is evicted from the cache. Therefore, the only data that is physically moved when navigating up/down the cache and/or when adding new nodes is the array of indexes.

FIG. 4 also shows a current offset ("MRofs") of the top-most item of the locked region 401 and a current offset ("NRofs") of the top-most item of the floating region 403. The two independent offsets are used to allow the floating region 403 to move independently from the locked region 401. For example, the offsets are initialized when the cache is empty as 2^31 and 2^31+M respectively. In another embodiment, an array of keys is used to support the iteration over the cache (not shown). Therefore, adding new cache items/objects to the top of the locked region 401 can be done by simply shifting a portion of the array of indexes down and placing the references to the cache objects in new slots and modifying the offset(s). By way of example, if the cache is initialized with MRofs=1000 and NRofs=1100, adding a new item/node to the top of the locked region results in: (1) allocating a new index for the item as #999; (2) shifting the array of indexes down (e.g., either only in the locked region or all the way through the floating region, depending if there is a gap between the locked and floating regions); and (3) placing the new index at the top and modifying MRofs=999 and NRoft=1099. Consequently, the item with the index #999 has the physical position #0 in the array (#999-MRofs=0), the item with the index #1000 has the physical position #1 (#1000-MRofs=1), etc. This approach avoids updating every single index when navigating up/down the cache by instead updating only the offsets of the "windows" to compensate for moving the nodes up and down. By analogy, adding new cache items/objects to the bottom of the floating region 403 can be done by simply shifting a portion of the array of indexes up and placing the references to the cache objects in new slots. A map is maintained that maps the keys to the indexes.

In one embodiment, the selection of the initial offsets relative to the default value of 2^31 depends on the implementation. For example, the value 2^31 is selected to add enough data to the top or to the bottom without overflowing the available range of desired integer indexes (i.e., 0 . . . 2^32-1). The system 100 avoids overflowing in either direction, i.e., to become negative or go beyond 2^32-1, by updating all indexes once MRofs approaches 0 or once MRofs+N+M approaches 2^32-1. It is noted, that in the example described herein, the indexes are used to track the order of item insertion, and have no meaning for the cache data.

To fetch a data item from the cache, the cache application 109a first obtains an index mapped to a key matching with the key of the requested data item. If no index is found in the map, the data item is not cached in the cache. If the index is found, the cache application 109a checks in which region the data item is located by comparing the index with a value of the NRofs. If the index≦NRofs, the data item is located in the locked region 401. If the index>NRofs, the data item is located in the floating region 403. The cache application 109a then calculates the actual address in the cache for the index based on the corresponding region starting offset, and then retrieves the data item at the address.

The cache also functions as the data model for the application. Thus, instead of handling separated data structures (e.g. mailbox, message groups), the application accesses the cache using the iterator 409. The iterator 409 allows the application to move up/down/to the first data item or the last data item, and preserves its own position when the cache is updated.

The cache provides the iterator 409 to allow sequential access to the cache nodes. If the two regions (e.g., the locked region 401 and the floating region 403) overlap or they form one contiguous region, one iterator provides seamless access to the entire data items of the regions. Once the floating region 403 detaches from the locked region 401, the iterator 409 cannot move freely between the two regions. Instead, the iterator can be explicitly requested for the locked region 401 or for the floating region 403, since the application logic will only works in one region at a time.

In another embodiment, the cache application 109a supports multiple views on the same data set in the server, two iterators are respectively associated with the locked region 401 and the floating region 403 to show both windows in the data model of the server side at the same time. In one embodiment, the number of iterators concurrently acquired for each cache is limited, and normally does not exceed two. In other embodiments, there are no limitations on the number of iterators.

FIGS. 5-11 are diagrams of data item/chunk updating scenarios in an application-level cache, according to various embodiments. The numbers in the boxes of these diagrams are examples of the indexes of the cached items. The indexes can be any unique symbols other than numbers, such as alphabets. The order of the numbers is implicit and determined by the order of insertion of a data item. By way of example, data items "B783", "A1000" and "XZ637" have indexes #0, #1 and #2 respectively, when being added to the end of the cache in this order. When updating the cache with a new data item or chunk, there may be overlap between the new data item or chunk and the set of cache nodes in the cache. When both data sets in the cache and in the update data chunk are ordered, the cache application 109*a* flushes the head or tail of the cache depending on an insertion position (e.g., the top or the bottom of the cache) of the new data chunk into the cache (if a matching data item ID is found). These scenarios assume that the locked region of the cache is configured to hold up to M nodes and the floating region up to N nodes. To simplify the discussion, operations like storing the cache contents persistably and loading the cache contents are omitted from these scenarios. The cache is persistable, i.e. its content survives the application restart.

When the cache is empty, new nodes are inserted first into the locked region, and then into the floating region. The cache grows in either direction until the locked region becomes full. Thereafter, the floating region starts growing at the bottom of the cache. Eventually, the cache contains M+N nodes, and the floating region immediately follows the locked region. As long as the regions are adjacent, an iterator can traverse the whole cache.

Figure 5:
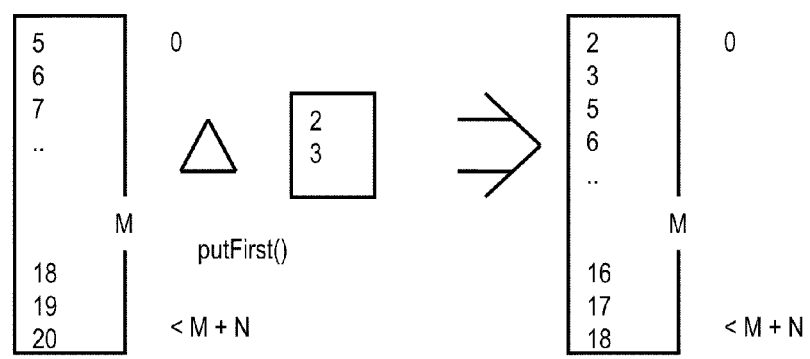
FIGS. 5-9, 10A, 10B, 11A, and 11B are diagrams of data item/chunk updating scenarios in an application-level cache, according to various embodiments.

FIG. 5 shows a scenario in which the cache contains fewer than N+M nodes in two adjacent regions, and new unique nodes are inserted at the top of the cache. The cache application 109*a* uses an instruction: putFirst (2, 3) to add the new nodes (e.g., 2, 3) to the beginning of the cache. The same number of nodes is moved from the locked region to the beginning of the floating region.

Figure 6:
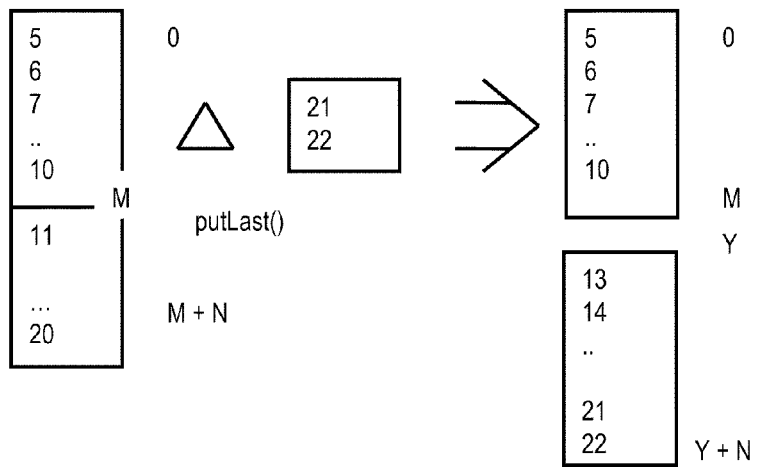

FIG. 6 shows a scenario in which the cache contains N+M nodes in two adjacent regions and new unique nodes are inserted at the bottom of the cache. The cache application 109*a* uses an instruction: putLast (21, 22) to add the new nodes (e.g., 21, 22) to the end of the cache. The same number of nodes (e.g., 11, 12) is flushed from the beginning of the floating region thereby leaving a gap between the floating region and the locked region.

Figure 7:
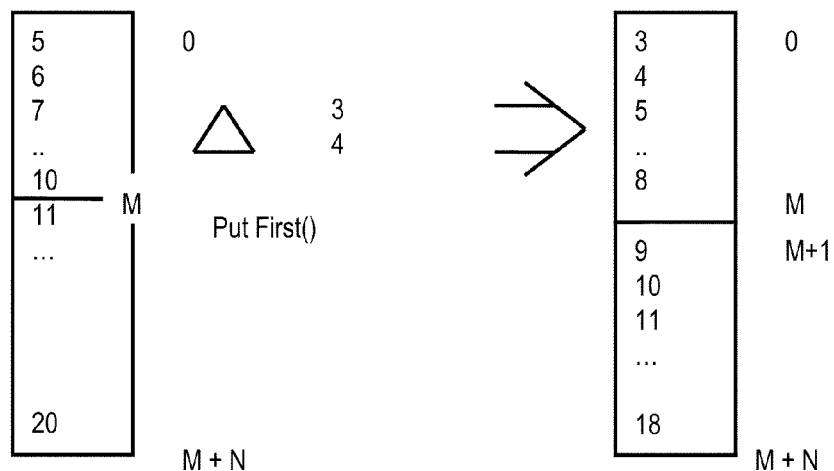

FIG. 7 shows a scenario in which the cache contains N+M nodes in two adjacent regions, and new unique nodes are inserted at the top of the cache. The cache application 109*a* uses the instruction: putFirst (2, 3) to add the new nodes (e.g., 2, 3) to the beginning of the cache. The same number of nodes is moved from the locked region to the beginning of the floating region, and the same number of nodes (e.g., 19, 20) is subsequently flushed from the bottom of the floating region.

Figure 8:
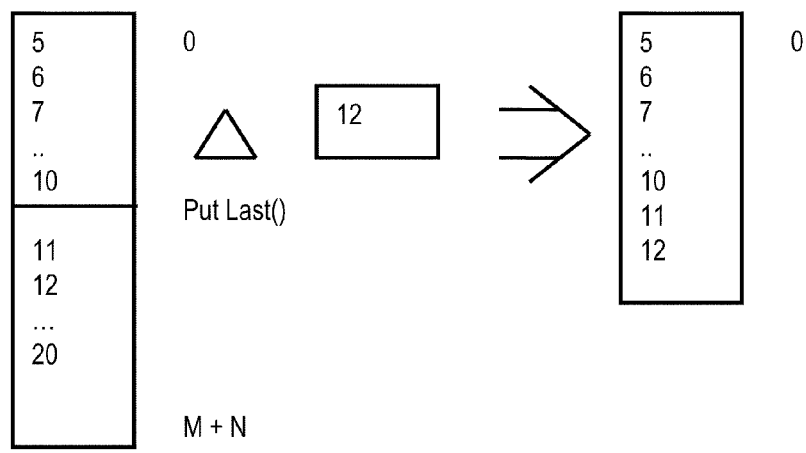

FIG. 8 shows a scenario in which a node with a known index is inserted at the bottom of the cache. The cache application 109*a* first flushes all the nodes from the nodes having the same index (inclusive) to the end (e.g., 12 . . . 20). The cache application 109*a* then inserts the new node with the index 12 to the end of the cache. If the node with the same index is located in the locked region, the floating region is flushed entirely together with the tail part of the locked region starting from the node with a matching index.

Figure 9:
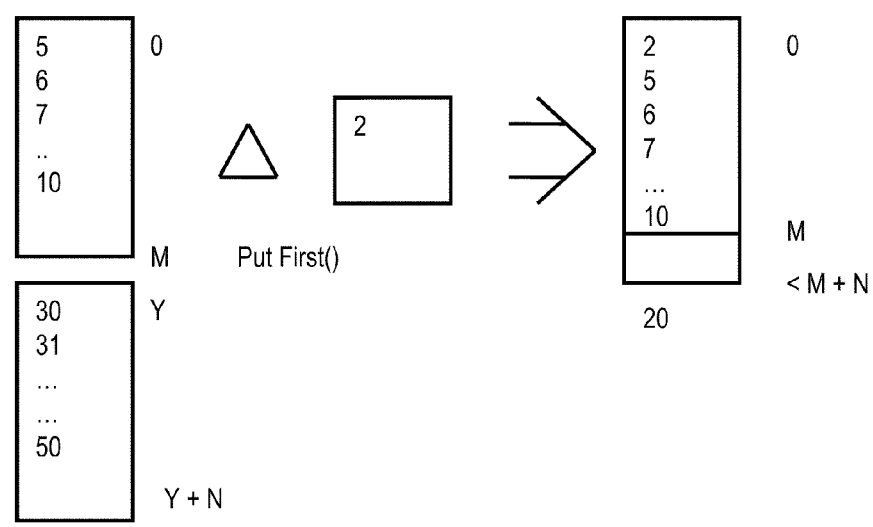

FIG. 9 shows a scenario in which the cache contains N+M nodes in two separate regions and a new unique node is inserted at the top of the locked region. The cache application 109*a* adds the new node to the top of the locked region. Since this operation is possible only when the user navigates to the beginning of the cache, the cache application 109*a* flashes the floating region (30 . . . 50) of the cache.

The cache contains at most N+M nodes, and an iterator is acquired to navigate with the cache. Regardless of which one of the regions (e.g., locked or floating region) is requested, the iterator allows navigating from the top to the bottom of the cache, transparently crossing the continuous regions. In some cases, the floating region gets detached from the locked region while an iterator exists. Depending on the current position of the iterator, its scope becomes limited to either the locked or floating region. The position of the iterator is within the floating region (most likely at the bottom of it), which causes the cache to growth. While iterating over a region, the cache gets updated by adding and/or removing some node(s) above or below the current position. The iterator sticks to its current position determined by the key associated with the current cache node. Any cache modifications not affecting this current node only affect the scope of the navigation.

Figure 10A:
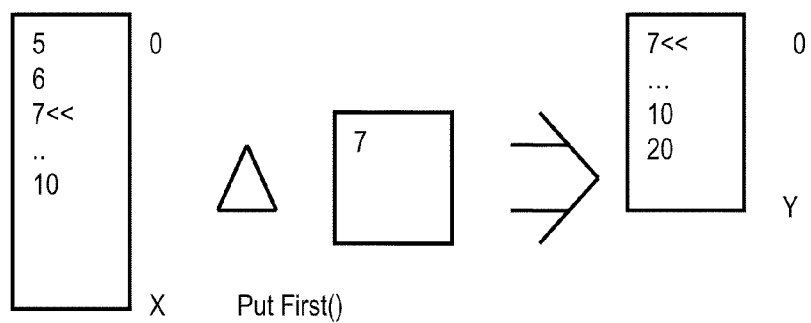
Figure 10B:
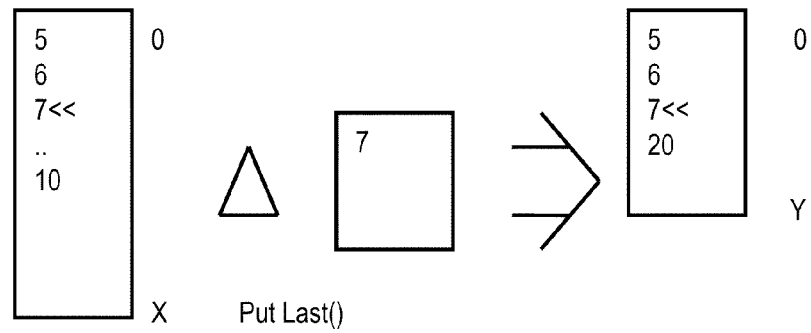

FIGS. 10A-10B show scenarios in which a current data item is updated while iterating over a region. The current node is neither the first node nor the last node. When the current node (e.g., 7) is going to be the first node, the nodes (e.g., 5, 6) before the current node are flushed as shown in FIG. 10A. When the current node (e.g., 7) is going to be the last node, the nodes (e.g., 8, 9, 10) after the current node are flushed as shown in FIG. 10B.

Figure 11A:
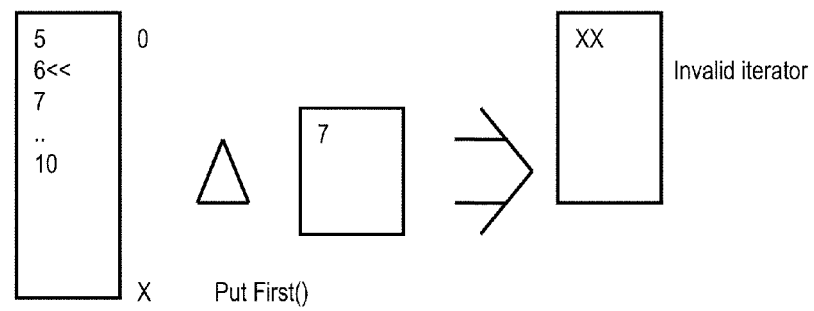
Figure 11B:
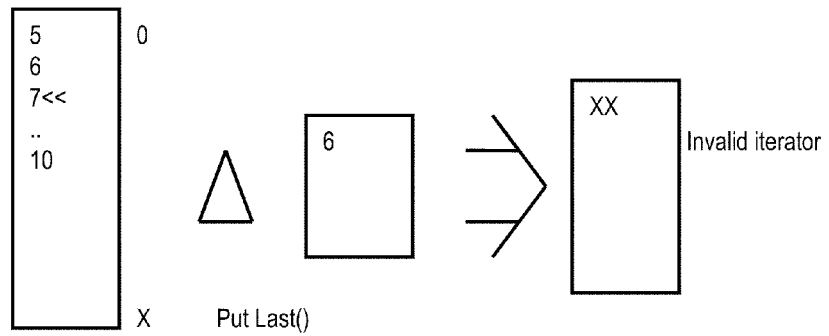

FIGS. 11A-11B show scenarios in which a current item is flushed while iterating over a region due to inconsistency between the current node (e.g., 7) and the position of the iterator (e.g., 6). The whole cache is flushed as a result of the invalid iterator. When the current node (e.g., 7) is going to be the first node while the iterator makes the current position at 6, all node are flushed out of the cache as shown in FIG. 11A. When the current node (e.g., 6) is going to be the last node while the iterator makes the current position at 7, all nodes are flushed out of the cache as shown in FIG. 11B.

Figure 12:
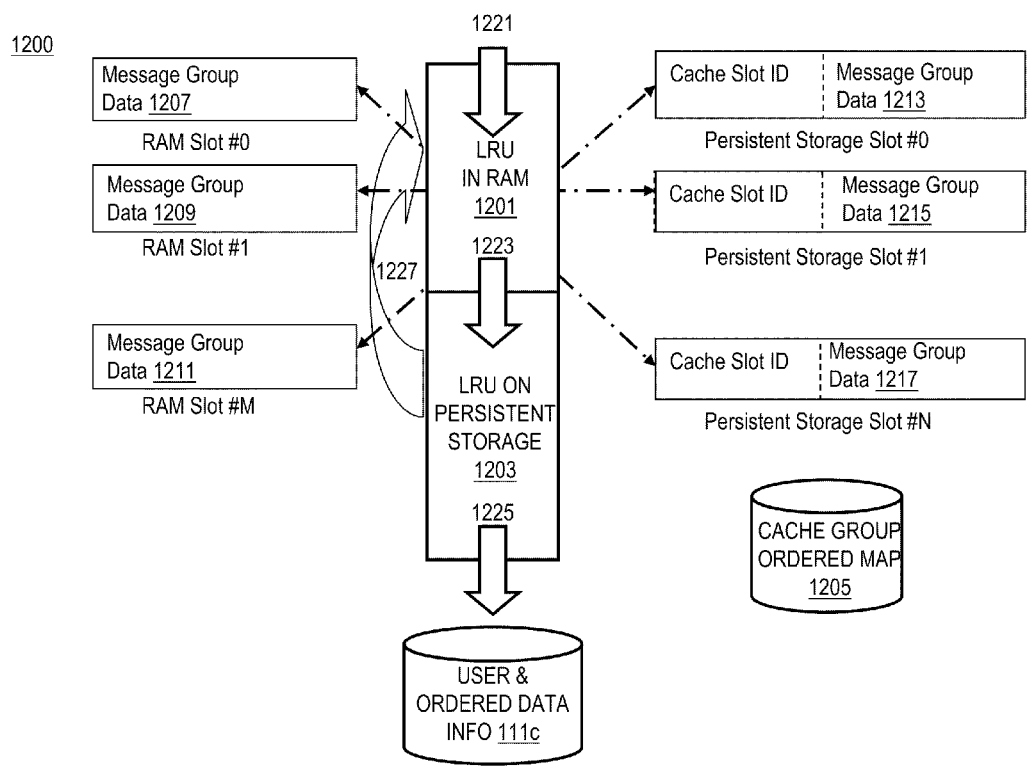
FIG. 12 is a diagram of a cache group architecture, according to one embodiment.

FIG. 12 is a diagram of a cache group architecture, according to one embodiment. The cache application 109*a* further creates an architecture for a cache group to deal with message groups like separate folders of conversation threads of different topics (e.g., finance, politics, etc.). In one embodiment, a cache group functions as a cache 1200 of caches for message groups applying the LRU eviction policy for the message group data items therein. This involves a two-step eviction: first from the RAM 1201 to the persistent storage 1203, and then from the persistent storage 1203 (flushing out of the cache). To prevent resource (message group, and data items, etc.) from leaking, the cache application 109*a* maps message groups in the cache group to fixed "slots". The order of the slots is independent from an order of cached data items.

Each cache group represents one data domain (e.g., all message groups accessed from a particular bulletin board or discussion forum). A cache group has the following parameters: a number of in-RAM caches (M) and a number of caches swapped out to the persistent storage (N). M is usually smaller than N. The cache group 1200 stores more data in the persistent storage 1203 than in the RAM 1201 for the message groups. For example, M is 4 and N is 6. The persistent storage 1203 is organized as N "slots" with fixed cache slot IDs (e.g., file names for the file system-based devices). This allows for re-scanning of all slots and subsequent reloading of the cache group with the most up-to-date information. By way of example, the RAM slots #0, #1, #2, #3 and the persistent storage slots #0, #1, #2 are assigned to the thread "finance", the persistent storage slots #3, #4 and #5 are assigned to the thread "politics", and each slot can store 10 messages or comments. As a result, the message groups 1207, 1209, and 1211 are stored in the RAM slots, while the message groups 1213, 1215, and 1217 are stored in the persistent storage slots. In the example of FIG. 12, the thread "finance" is assigned with more space than the thread "politics" because more users comment under the thread "finance" than under the thread "politics". The users can create new threads/topics and new messages/comments in addition to the existing ones. As another example, the system 100 establishes a cache group for a user's email system with mailboxes (e.g., Inbox, Outbox, etc.) each constituting a cache and including a message group therein. The Inbox is assigned with more space than the Outbox because most users use the Inbox more often than the Outbox.

In one embodiment, after applying default settings, the cache application 109a can monitor the user's usage patterns and adjusts the cache group architecture accordingly. The information of the cache group architecture as well as a cache group ordered map is stored in a memory 1205.

For storing the message group content (content of the messages in the same thread), the cache provides a way to store a certain number (e.g., 10) of message groups and a certain number (e.g., 20-30) of messages in each group. The application logic accesses different groups in no particular order, sees the most recent messages (their content) first, and may move up to the older messages in the group. This kind of cache of caches is persistent after the application restarts, such that it can recover from a persistent storage failure. In a conventional simple cache, a persistent storage failure results in the loss of the cache content. In the message group cache, the application logic tracks cache files based upon the slot number and ensures that no cache files get abandoned and left in the device file system forever after the storage failure.

Each message group in the cache group has its unique cache slot ID within this cache group. By way of example, for social messaging implementation, each of the message groups also constitutes an individual cache, and each of the caches represents a partial view on the particular email box content on the server side. When message group content with a particular cache slot ID is requested, the cache application 109a first checks if the content is already in the RAM 1201. If it is, then the cache application 109a sends the content to the caller immediately. Since the cache application 109a uses the LRU policy, this cache slot ID goes to the top of the cache group map as shown by an arrow 1221. If the requested content does not exist in the RAM 1201 but exists in the persistent storage 1203, the cache application 109a loads the content from the persistent storage 1203 into the RAM 1201 (as shown by an arrow 1227), pushes the content on top of the cache group map, and sends the message group content to the caller. Consequently, when the RAM 1201 gets full, the least recently used cache gets pushed to the persistent storage 1203 (as shown by an arrow 1223) and discarded from the RAM (as shown by an arrow 1225).

When a cache slot ID that is not known to the cache group is requested, the cache application 109a returns nothing to the caller. As a result, the caller fetches the data over the network and adds a new cache group item with this new cache slot ID into the cache 1200. The new cache group item is added to the top of the cache group map (as shown by the arrow 1221), and the whole map gets shifted down by one slot. In other words, the least recently accessed in-RAM object gets pushed to the persistent storage 1203 (as shown by the arrow 1223), and the least recently accessed persisted object gets discarded (as shown by the arrow 1225). However, the new cache group item just added to the cache physically occupies the persistent storage slot left by the evicted object. As discussed with respect to the indexes 405 of the cache architecture 400 of FIG. 4, the cache slot IDs are similarly mapped to the message group data 1213, 1215, 1217, etc. such that the cache application 109a moves around the cache slot IDs without physically moving the message group data, but yet retrieves the message group data based upon the mapping. When the caches are moved back and forth within the persistent storage 1203 with respect to the slot IDs, they do not actually get moved physically in the cache. Instead, they continue using the same physical addresses until they are evicted from the persistent storage 1203.

Figure 13:
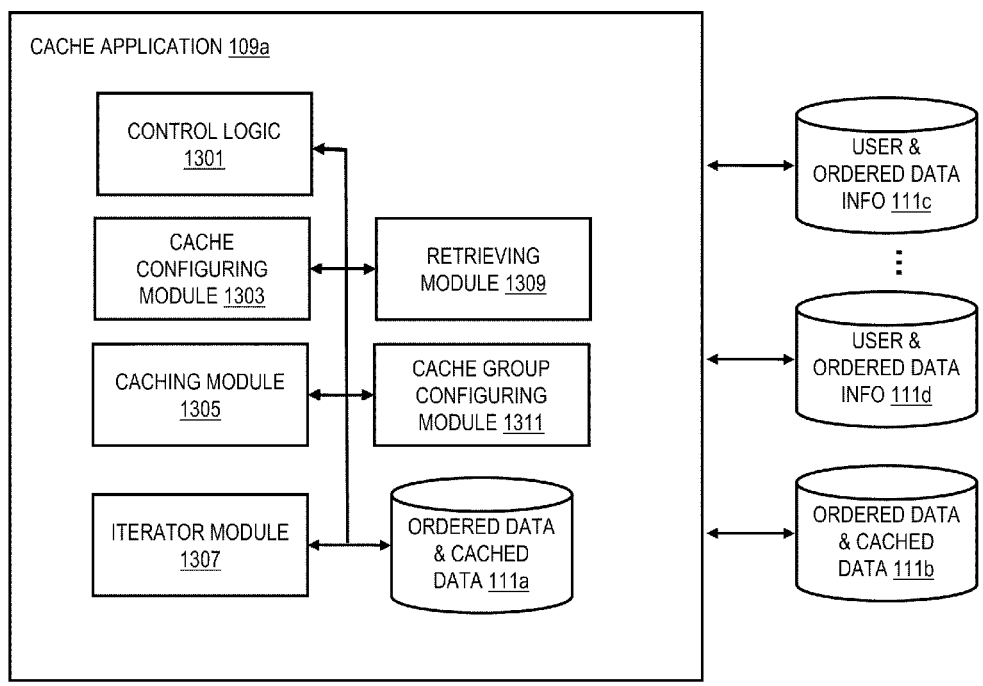
FIG. 13 is a diagram of the components of a cache application, according to one embodiment.

FIG. 13 is a diagram of the components of a cache application, according to one embodiment. By way of example, the cache application 109a includes one or more components for providing an application-level cache. It is contemplated that the functions of these components may be combined in one or more components or performed by other components of equivalent functionality. It is contemplated that the cache application 109a can reside on the UE 101a, the PC 101b, or any other mobile devices. It is also contemplated that the functions of these components of the cache application 109a may be shared among different devices, equipment, or platforms over the network 105. It is further contemplated that the functions of these components of the cache application 109a may be combined in one or more components or performed by other components of equivalent functionality.

In this embodiment, the cache application 109a includes a control logic 1301 which executes at least one algorithm, stored in one or more memory modules, for performing cache functions of the cache application. The cache application 109a further includes a cache configuring module 1303 which configures, for an application of the UE 101a (e.g., email messing), at least one memory of the UE 101a into an application-level cache with a locked region and a floating region.

The cache application 109a further includes a caching module 1305 which caches into the locked region at least one data item that is received from a server and anticipated to be requested via the application, thereby preventing the data item from being evicted from the cache. The caching module 1305 also caches into each of the locked region and the floating region ordered data items that are anticipated to be requested via the application. When each of the locked region and the floating region are full, the caching module 1305 caches a new data item into the cache by moving the indexes without physically moving the cached data items except a data item evicted from the cache. The caching module 1305 marks a position in the set of ordered data items. The position is included in the data items cached in the floating region. The caching module 1305 then retrieves new data items from the marked position forward or backward in the set of ordered data items to be cached in the floating region.

The cache application 109a further includes an iterator module 1307 which uses an iterator to access the cached data items. The cache application 109a further includes a key module 1309 which receives from the server unique keys that each corresponds to one of the data items addressed by a corresponding one of the unique keys in the server, and maps each of the received keys to an item index in the locked region or an index in the floating region.

The cache application 109a further includes a retrieving module 1309 which receives a request for a data item with a corresponding unique key, obtains an item index mapped to the unique key, retrieves a cached data item corresponding to the item index, and replies to the request with the retrieved data item.

The cache application 109a further includes a cache group configuring module 1311 which configures for the application the at least one memory of the mobile terminal into an application-level cache group with a fixed number of slots. Thereafter, the caching module 1305 caches into each of the slots one group of ordered data that is received from the server and anticipated to be requested via the application, thereby applying a least recently used (LRU) eviction policy per group to insert into or evict from the cache. When each of the fast memory and the persistent storage are full, the caching module 1305 caches a new data group into the cache by moving slots identifiers without physically moving the cached data groups except a data group evicted from the cache.

The above-described embodiments provide an application level cache having ordered data that allows adding a data object/item into the beginning or to the end of the cache so as to virtually map unlimited amount of data of a server therein without actually downloading all the data to the cache. The cache is also used as a data model on the mobile device to provide a partial view of the server-side data model. In particular, the cache is organized to include a locked region whose items are prevented from being evicted and a floating region that allows the application logic to navigate with a floating data "window" endlessly to see at least a partial view of the server side data. The content of the locked region remains mostly unchanged, while new items are added into the end of the floating region (eventually causing the floating region to "detach" from the locked region and to evict data items there between).

The above-described embodiments also provide an iterator that allows application logic to traverse/navigate through all the items of a data model, regardless of its specific implementation. The iterator is lenient enough to survive cache updates during the navigation. Using of the iterator keeps the UI from noticing the changes/updates happening to the underlying data.

The above-described embodiments further provide a cache group to deal with message groups like email boxes. Cache group is a cache of caches using the LRU eviction policy for the group data items. This two-step eviction includes first evicting from the RAM to the persistent storage and then evicting from the persistent storage (just flushing out). To prevent resource leaking, the system 100 maps the cache groups to fixed slots. The order of the slots is independent from an order of cache items.

The processes described herein for providing an application-level cache may be advantageously implemented via software, hardware (e.g., general processor, Digital Signal Processing (DSP) chip, an Application Specific Integrated Circuit (ASIC), Field Programmable Gate Arrays (FPGAs), etc.), firmware or a combination thereof. Such exemplary hardware for performing the described functions is detailed below.

Figure 14:
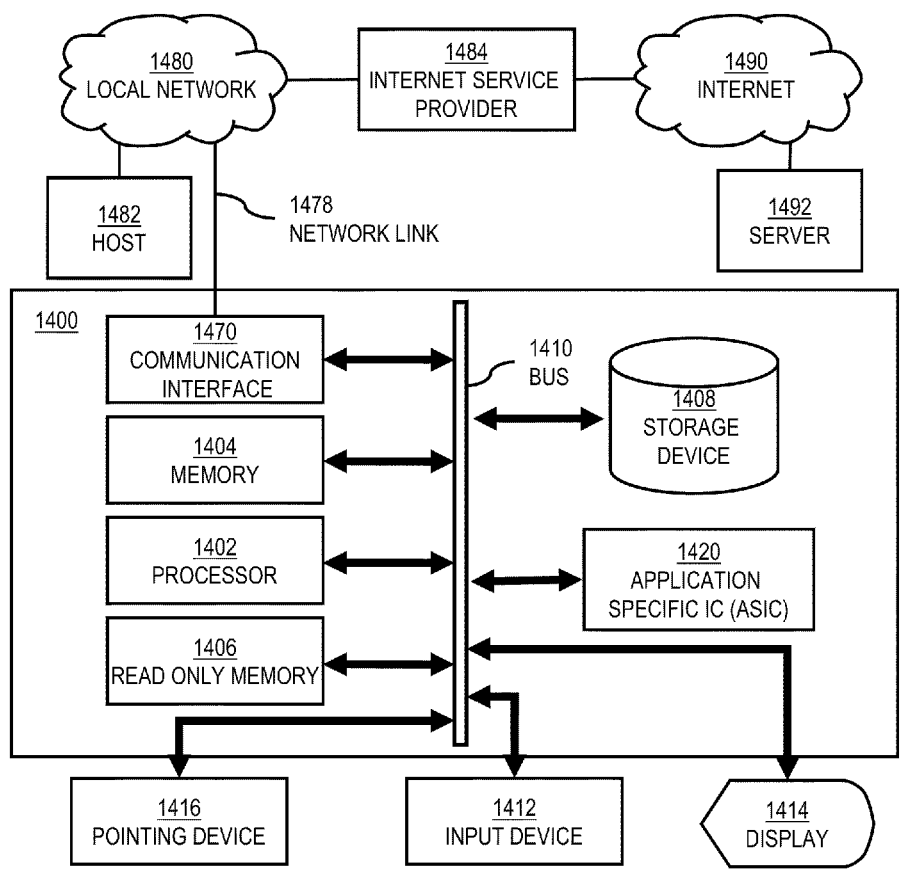
FIG. 14 is a diagram of hardware that can be used to implement an embodiment of the invention.

FIG. 14 illustrates a computer system 1400 upon which an embodiment of the invention may be implemented. Although computer system 1400 is depicted with respect to a particular device or equipment, it is contemplated that other devices or equipment (e.g., network elements, servers, etc.) within FIG. 14 can deploy the illustrated hardware and components of system 1400. Computer system 1400 is programmed (e.g., via computer program code or instructions) to provide an application-level cache as described herein and includes a communication mechanism such as a bus 1410 for passing information between other internal and external components of the computer system 1400. Information (also called data) is represented as a physical expression of a measurable phenomenon, typically electric voltages, but including, in other embodiments, such phenomena as magnetic, electromagnetic, pressure, chemical, biological, molecular, atomic, subatomic and quantum interactions. For example, north and south magnetic fields, or a zero and non-zero electric voltage, represent two states (0, 1) of a binary digit (bit). Other phenomena can represent digits of a higher base. A superposition of multiple simultaneous quantum states before measurement represents a quantum bit (qubit). A sequence of one or more digits constitutes digital data that is used to represent a number or code for a character. In some embodiments, information called analog data is represented by a near continuum of measurable values within a particular range. Computer system 1400, or a portion thereof, constitutes a means for performing one or more steps of providing an application-level cache.

A bus 1410 includes one or more parallel conductors of information so that information is transferred quickly among devices coupled to the bus 1410. One or more processors 1402 for processing information are coupled with the bus 1410.

A processor 1402 performs a set of operations on information as specified by computer program code related to provide an application-level cache. The computer program code is a set of instructions or statements providing instructions for the operation of the processor and/or the computer system to perform specified functions. The code, for example, may be written in a computer programming language that is compiled into a native instruction set of the processor. The code may also be written directly using the native instruction set (e.g., machine language). The set of operations include bringing information in from the bus 1410 and placing information on the bus 1410. The set of operations also typically include comparing two or more units of information, shifting positions of units of information, and combining two or more units of information, such as by addition or multiplication or logical operations like OR, exclusive OR (XOR), and AND. Each operation of the set of operations that can be performed by the processor is represented to the processor by information called instructions, such as an operation code of one or more digits. A sequence of operations to be executed by the processor 1402, such as a sequence of operation codes, constitute processor instructions, also called computer system instructions or, simply, computer instructions. Processors may be implemented as mechanical, electrical, magnetic, optical, chemical or quantum components, among others, alone or in combination.

Computer system 1400 also includes a memory 1404 coupled to bus 1410. The memory 1404, such as a random access memory (RAM) or other dynamic storage device, stores information including processor instructions for providing an application-level cache. Dynamic memory allows information stored therein to be changed by the computer system 1400. RAM allows a unit of information stored at a location called a memory address to be stored and retrieved independently of information at neighboring addresses. The memory 1404 is also used by the processor 1402 to store temporary values during execution of processor instructions. The computer system 1400 also includes a read only memory (ROM) 1406 or other static storage device coupled to the bus 1410 for storing static information, including instructions, that is not changed by the computer system 1400. Some memory is composed of volatile storage that loses the information stored thereon when power is lost. Also coupled to bus 1410 is a non-volatile (persistent) storage device 1408, such as a magnetic disk, optical disk or flash card, for storing information, including instructions, that persists even when the computer system 1400 is turned off or otherwise loses power.

Information, including instructions for providing an application-level cache, is provided to the bus 1410 for use by the processor from an external input device 1412, such as a keyboard containing alphanumeric keys operated by a human user, or a sensor. A sensor detects conditions in its vicinity and transforms those detections into physical expression compatible with the measurable phenomenon used to represent information in computer system 1400. Other external devices coupled to bus 1410, used primarily for interacting with humans, include a display device 1414, such as a cathode ray tube (CRT) or a liquid crystal display (LCD), or plasma screen or printer for presenting text or images, and a pointing device 1416, such as a mouse or a trackball or cursor direction keys, or motion sensor, for controlling a position of a small cursor image presented on the display 1414 and issuing commands associated with graphical elements presented on the display 1414. In some embodiments, for example, in embodiments in which the computer system 1400 performs all functions automatically without human input, one or more of external input device 1412, display device 1414 and pointing device 1416 is omitted.

In the illustrated embodiment, special purpose hardware, such as an application specific integrated circuit (ASIC) 1420, is coupled to bus 1410. The special purpose hardware is configured to perform operations not performed by processor 1402 quickly enough for special purposes. Examples of application specific ICs include graphics accelerator cards for generating images for display 1414, cryptographic boards for encrypting and decrypting messages sent over a network, speech recognition, and interfaces to special external devices, such as robotic arms and medical scanning equipment that repeatedly perform some complex sequence of operations that are more efficiently implemented in hardware.

Computer system 1400 also includes one or more instances of a communications interface 1470 coupled to bus 1410. Communication interface 1470 provides a one-way or two-way communication coupling to a variety of external devices that operate with their own processors, such as printers, scanners and external disks. In general the coupling is with a network link 1478 that is connected to a local network 1480 to which a variety of external devices with their own processors are connected. For example, communication interface 1470 may be a parallel port or a serial port or a universal serial bus (USB) port on a personal computer. In some embodiments, communications interface 1470 is an integrated services digital network (ISDN) card or a digital subscriber line (DSL) card or a telephone modem that provides an information communication connection to a corresponding type of telephone line. In some embodiments, a communication interface 1470 is a cable modem that converts signals on bus 1410 into signals for a communication connection over a coaxial cable or into optical signals for a communication connection over a fiber optic cable. As another example, communications interface 1470 may be a local area network (LAN) card to provide a data communication connection to a compatible LAN, such as Ethernet. Wireless links may also be implemented. For wireless links, the communications interface 1470 sends or receives or both sends and receives electrical, acoustic or electromagnetic signals, including infrared and optical signals, that carry information streams, such as digital data. For example, in wireless handheld devices, such as mobile telephones like cell phones, the communications interface 1470 includes a radio band electromagnetic transmitter and receiver called a radio transceiver. In certain embodiments, the communications interface 1470 enables connection from the UE 101*a* to the communication network 105 for providing ordered data to be cached therein.

The term computer-readable medium is used herein to refer to any medium that participates in providing information to processor 1402, including instructions for execution. Such a medium may take many forms, including, but not limited to, non-volatile media, volatile media and transmission media. Non-volatile media include, for example, optical or magnetic disks, such as storage device 1408. Volatile media include, for example, dynamic memory 1404. Transmission media include, for example, coaxial cables, copper wire, fiber optic cables, and carrier waves that travel through space without wires or cables, such as acoustic waves and electromagnetic waves, including radio, optical and infrared waves. Signals include man-made transient variations in amplitude, frequency, phase, polarization or other physical properties transmitted through the transmission media. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, an EPROM, a FLASH-EPROM, any other memory chip or cartridge, a carrier wave, or any other medium from which a computer can read. The term computer-readable storage medium is used herein to refer to any computer-readable medium except transmission media.

Logic encoded in one or more tangible media includes one or both of processor instructions on a computer-readable storage media and special purpose hardware, such as ASIC 1420.

Network link 1478 typically provides information communication using transmission media through one or more networks to other devices that use or process the information. For example, network link 1478 may provide a connection through local network 1480 to a host computer 1482 or to equipment 1484 operated by an Internet Service Provider (ISP). ISP equipment 1484 in turn provides data communication services through the public, world-wide packet-switching communication network of networks now commonly referred to as the Internet 1490.

A computer called a server host 1492 connected to the Internet hosts a process that provides a service in response to information received over the Internet. For example, server host 1492 hosts a process that provides information representing video data for presentation at display 1414. It is contemplated that the components of system 1400 can be deployed in various configurations within other computer systems, e.g., host 1482 and server 1492.

At least some embodiments of the invention are related to the use of computer system 1400 for implementing some or all of the techniques described herein. According to one embodiment of the invention, those techniques are performed by computer system 1400 in response to processor 1402 executing one or more sequences of one or more processor instructions contained in memory 1404. Such instructions, also called computer instructions, software and program code, may be read into memory 1404 from another computer-readable medium such as storage device 1408 or network link 1478. Execution of the sequences of instructions contained in memory 1404 causes processor 1402 to perform one or more of the method steps described herein. In alternative embodiments, hardware, such as ASIC 1420, may be used in place of or in combination with software to implement the invention.

Thus, embodiments of the invention are not limited to any specific combination of hardware and software, unless otherwise explicitly stated herein.

The signals transmitted over network link 1478 and other networks through communications interface 1470, carry information to and from computer system 1400. Computer system 1400 can send and receive information, including program code, through the networks 1480, 1490 among others, through network link 1478 and communications interface 1470. In an example using the Internet 1490, a server host 1492 transmits program code for a particular application, requested by a message sent from computer 1400, through Internet 1490, ISP equipment 1484, local network 1480 and communications interface 1470. The received code may be executed by processor 1402 as it is received, or may be stored in memory 1404 or in storage device 1408 or other non-volatile storage for later execution, or both. In this manner, computer system 1400 may obtain application program code in the form of signals on a carrier wave.

Various forms of computer readable media may be involved in carrying one or more sequence of instructions or data or both to processor 1402 for execution. For example, instructions and data may initially be carried on a magnetic disk of a remote computer such as host 1482. The remote computer loads the instructions and data into its dynamic memory and sends the instructions and data over a telephone line using a modem. A modem local to the computer system 1400 receives the instructions and data on a telephone line and uses an infra-red transmitter to convert the instructions and data to a signal on an infra-red carrier wave serving as the network link 1478. An infrared detector serving as communications interface 1470 receives the instructions and data carried in the infrared signal and places information representing the instructions and data onto bus 1410. Bus 1410 carries the information to memory 1404 from which processor 1402 retrieves and executes the instructions using some of the data sent with the instructions. The instructions and data received in memory 1404 may optionally be stored on storage device 1408, either before or after execution by the processor 1402.

Figure 15:
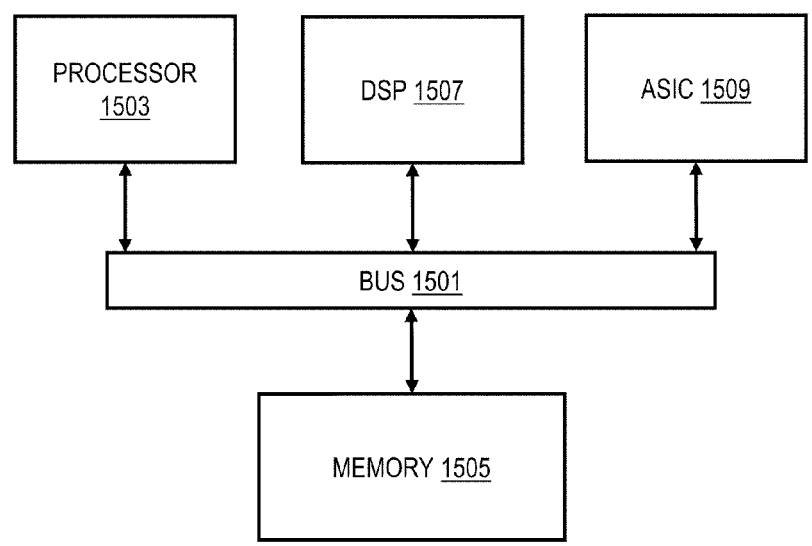
FIG. 15 is a diagram of a chip set that can be used to implement an embodiment of the invention.

FIG. 15 illustrates a chip set 1500 upon which an embodiment of the invention may be implemented. Chip set 1500 is programmed to provide an application-level cache as described herein and includes, for instance, the processor and memory components described with respect to FIG. 14 incorporated in one or more physical packages (e.g., chips). By way of example, a physical package includes an arrangement of one or more materials, components, and/or wires on a structural assembly (e.g., a baseboard) to provide one or more characteristics such as physical strength, conservation of size, and/or limitation of electrical interaction. It is contemplated that in certain embodiments the chip set can be implemented in a single chip. Chip set 1500, or a portion thereof, constitutes a means for performing one or more steps of providing an application-level cache.

In one embodiment, the chip set 1500 includes a communication mechanism such as a bus 1501 for passing information among the components of the chip set 1500. A processor 1503 has connectivity to the bus 1501 to execute instructions and process information stored in, for example, a memory 1505. The processor 1503 may include one or more processing cores with each core configured to perform independently. A multi-core processor enables multiprocessing within a single physical package. Examples of a multi-core processor include two, four, eight, or greater numbers of processing cores. Alternatively or in addition, the processor 1503 may include one or more microprocessors configured in tandem via the bus 1501 to enable independent execution of instructions, pipelining, and multithreading. The processor 1503 may also be accompanied with one or more specialized components to perform certain processing functions and tasks such as one or more digital signal processors (DSP) 1507, or one or more application-specific integrated circuits (ASIC) 1509. A DSP 1507 typically is configured to process real-world signals (e.g., sound) in real time independently of the processor 1503. Similarly, an ASIC 1509 can be configured to performed specialized functions not easily performed by a general purposed processor. Other specialized components to aid in performing the inventive functions described herein include one or more field programmable gate arrays (FPGA) (not shown), one or more controllers (not shown), or one or more other special-purpose computer chips.

The processor 1503 and accompanying components have connectivity to the memory 1505 via the bus 1501. The memory 1505 includes both dynamic memory (e.g., RAM, magnetic disk, writable optical disk, etc.) and static memory (e.g., ROM, CD-ROM, etc.) for storing executable instructions that when executed perform the inventive steps described herein to provide an application-level cache. The memory 1505 also stores the data associated with or generated by the execution of the inventive steps.

Figure 16:
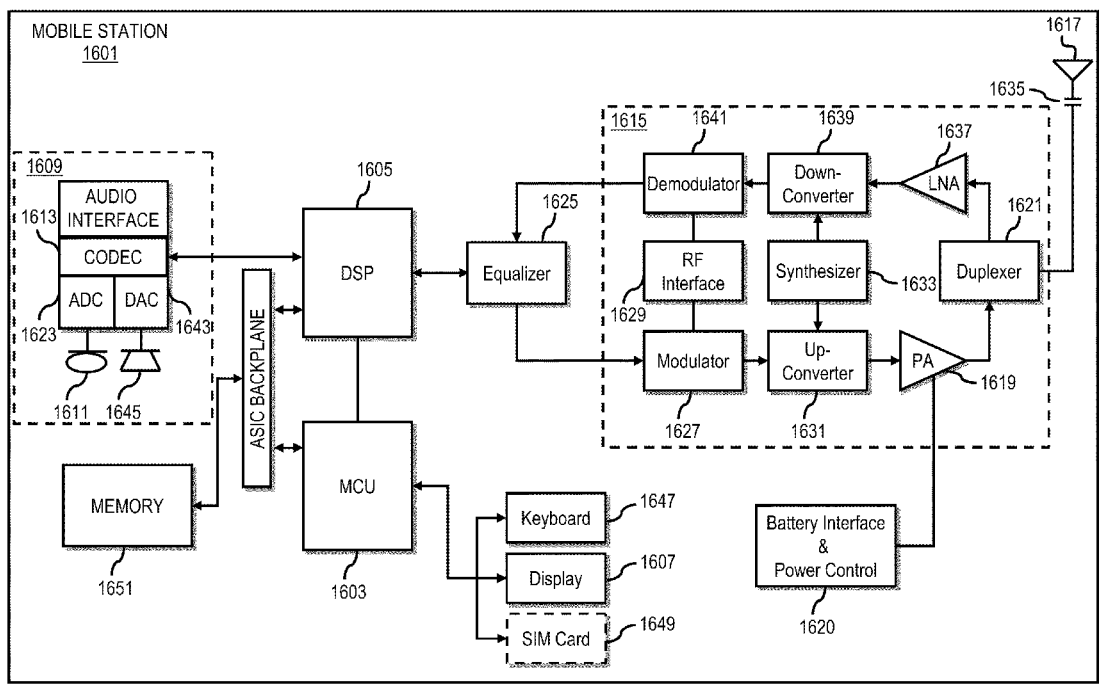
FIG. 16 is a diagram of a mobile terminal (e.g., a handset) that can be used to implement an embodiment of the invention.

FIG. 16 is a diagram of exemplary components of a mobile terminal (e.g., handset) for communications, which is capable of operating in the system of FIG. 1, according to one embodiment. In some embodiments, mobile terminal 1600, or a portion thereof, constitutes a means for performing one or more steps of providing an application-level cache. Generally, a radio receiver is often defined in terms of front-end and back-end characteristics. The front-end of the receiver encompasses all of the Radio Frequency (RF) circuitry whereas the back-end encompasses all of the base-band processing circuitry. As used in this application, the term "circuitry" refers to both: (1) hardware-only implementations (such as implementations in only analog and/or digital circuitry), and (2) to combinations of circuitry and software (and/or firmware) (such as, if applicable to the particular context, to a combination of processor(s), including digital signal processor(s), software, and memory(ies) that work together to cause an apparatus, such as a mobile phone or server, to perform various functions). This definition of "circuitry" applies to all uses of this term in this application, including in any claims. As a further example, as used in this application and if applicable to the particular context, the term "circuitry" would also cover an implementation of merely a processor (or multiple processors) and its (or their) accompanying software/or firmware. The term "circuitry" would also cover if applicable to the particular context, for example, a baseband integrated circuit or applications processor integrated circuit in a mobile phone or a similar integrated circuit in a cellular network device or other network devices.

Pertinent internal components of the telephone include a Main Control Unit (MCU) 1603, a Digital Signal Processor (DSP) 1605, and a receiver/transmitter unit including a microphone gain control unit and a speaker gain control unit. A main display unit 1607 provides a display to the user in support of various applications and mobile terminal functions that perform or support the steps of providing an application-level cache. The display 16 includes display circuitry configured to display at least a portion of a user interface of the mobile terminal (e.g., mobile telephone). Additionally, the display 1607 and display circuitry are configured to facilitate user control of at least some functions of the mobile terminal. An audio function circuitry 1609 includes a microphone 1611 and microphone amplifier that amplifies the speech signal output from the microphone 1611. The amplified speech signal output from the microphone 1611 is fed to a coder/decoder (CODEC) 1613.

A radio section 1615 amplifies power and converts frequency in order to communicate with a base station, which is included in a mobile communication system, via antenna 1617. The power amplifier (PA) 1619 and the transmitter/modulation circuitry are operationally responsive to the MCU 1603, with an output from the PA 1619 coupled to the duplexer 1621 or circulator or antenna switch, as known in the art. The PA 1619 also couples to a battery interface and power control unit 1620.

In use, a user of mobile terminal 1601 speaks into the microphone 1611 and his or her voice along with any detected background noise is converted into an analog voltage. The analog voltage is then converted into a digital signal through the Analog to Digital Converter (ADC) 1623. The control unit 1603 routes the digital signal into the DSP 1605 for processing therein, such as speech encoding, channel encoding, encrypting, and interleaving. In one embodiment, the processed voice signals are encoded, by units not separately shown, using a cellular transmission protocol such as global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., microwave access (WiMAX), Long Term Evolution (LTE) networks, code division multiple access (CDMA), wideband code division multiple access (WCDMA), wireless fidelity (WiFi), satellite, and the like.

The encoded signals are then routed to an equalizer 1625 for compensation of any frequency-dependent impairments that occur during transmission though the air such as phase and amplitude distortion. After equalizing the bit stream, the modulator 1627 combines the signal with a RF signal generated in the RF interface 1629. The modulator 1627 generates a sine wave by way of frequency or phase modulation. In order to prepare the signal for transmission, an up-converter 1631 combines the sine wave output from the modulator 1627 with another sine wave generated by a synthesizer 1633 to achieve the desired frequency of transmission. The signal is then sent through a PA 1619 to increase the signal to an appropriate power level. In practical systems, the PA 1619 acts as a variable gain amplifier whose gain is controlled by the DSP 1605 from information received from a network base station. The signal is then filtered within the duplexer 1621 and optionally sent to an antenna coupler 1635 to match impedances to provide maximum power transfer. Finally, the signal is transmitted via antenna 1617 to a local base station. An automatic gain control (AGC) can be supplied to control the gain of the final stages of the receiver. The signals may be forwarded from there to a remote telephone which may be another cellular telephone, other mobile phone or a land-line connected to a Public Switched Telephone Network (PSTN), or other telephony networks.

Voice signals transmitted to the mobile terminal 1601 are received via antenna 1617 and immediately amplified by a low noise amplifier (LNA) 1637. A down-converter 1639 lowers the carrier frequency while the demodulator 1641 strips away the RF leaving only a digital bit stream. The signal then goes through the equalizer 1625 and is processed by the DSP 1605. A Digital to Analog Converter (DAC) 1643 converts the signal and the resulting output is transmitted to the user through the speaker 1645, all under control of a Main Control Unit (MCU) 1603—which can be implemented as a Central Processing Unit (CPU) (not shown).

The MCU 1603 receives various signals including input signals from the keyboard 1647. The keyboard 1647 and/or the MCU 1603 in combination with other user input components (e.g., the microphone 1611) comprise a user interface circuitry for managing user input. The MCU 1603 runs a user interface software to facilitate user control of at least some functions of the mobile terminal 1601 to provide an application-level cache. The MCU 1603 also delivers a display command and a switch command to the display 1607 and to the speech output switching controller, respectively. Further, the MCU 1603 exchanges information with the DSP 1605 and can access an optionally incorporated SIM card 1649 and a memory 1651. In addition, the MCU 1603 executes various control functions required of the terminal. The DSP 1605 may, depending upon the implementation, perform any of a variety of conventional digital processing functions on the voice signals. Additionally, DSP 1605 determines the background noise level of the local environment from the signals detected by microphone 1611 and sets the gain of microphone 1611 to a level selected to compensate for the natural tendency of the user of the mobile terminal 1601.

The CODEC 1613 includes the ADC 1623 and DAC 1643. The memory 1651 stores various data including call incoming tone data and is capable of storing other data including music data received via, e.g., the global Internet. The software module could reside in RAM memory, flash memory, registers, or any other form of writable storage medium known in the art. The memory device 1651 may be, but not limited to, a single memory, CD, DVD, ROM, RAM, EEPROM, optical storage, or any other non-volatile storage medium capable of storing digital data.

An optionally incorporated SIM card 1649 carries, for instance, important information, such as the cellular phone number, the carrier supplying service, subscription details, and security information. The SIM card 1649 serves primarily to identify the mobile terminal 1601 on a radio network. The card 1649 also contains a memory for storing a personal telephone number registry, text messages, and user specific mobile terminal settings.

While the invention has been described in connection with a number of embodiments and implementations, the invention is not so limited but covers various obvious modifications and equivalent arrangements, which fall within the purview of the appended claims. Although features of the invention are expressed in certain combinations among the claims, it is contemplated that these features can be arranged in any combination and order.

What is claimed is:

1. A method comprising:
configuring at least one memory of a mobile terminal into an application-level cache with a locked region and a floating region; and
causing, at least in part, actions that result in caching into each of the locked region and the floating region of data items that are anticipated to be requested via an application of the mobile terminal,
wherein the floating region is attached to the locked region when the data items cached in the floating region are sequentially or directly ordered from the data items cached in the locked region, and the floating region is detached from the locked region when the data items cached in the floating region are no longer sequentially or directly ordered from the data items cached in the locked region so that there is a gap between the locked region and the floating region.

2. A method of claim 1, wherein the cached data items are one or more parts of a set of ordered data items that are received from a server.

3. A method of claim 2, further comprising:
marking a position in the set of ordered data items, wherein the position corresponds to a particular one of the data items cached in the floating region; and
retrieving data items relative to the marked position in the set of ordered data items for caching in the floating region.

4. A method of claim 3, further comprising:
causing, at least in part, actions that result in reception of one or more unique keys from the server,
wherein each of the one or more unique keys corresponds to a respective address of one of the data items at the server; and
mapping each of the one or more unique keys to a respective item index in either the locked region or the floating region.

5. A method of claim 4, further comprising:
causing, at least in part, actions that result in reception of a request for a data item, the request including a corresponding unique key;
obtaining an item index mapped to the unique key included in the request;
retrieving a cached data item corresponding to the item index; and
causing, at least in part, actions that result in transmission of the retrieved data item in reply to the request.

6. A method of claim 2, further comprising:
partitioning the cache into one or more cache groups, wherein each of the one or more cache groups contains a fixed number of slots; and
causing, at least in part, actions that result in caching, into each of the slots, of one group of the set of ordered data items that is anticipated to be requested via the application.

7. A method of claim 6, wherein the at least one memory includes a fast memory and a persistent storage, and the method further comprising:
when each of the fast memory and the persistent storage are full, replacing one of the cached groups of the set of ordered data items with a new group; and
moving slot identifiers corresponding to remaining ones of the cached groups without physically moving the cached groups within either the fast memory or the persistent storage.

8. An apparatus comprising:
at least one processor; and
at least one memory including computer program code,
the at least one memory and the computer program code configured to, with the at least one processor, cause the apparatus to perform at least the following,
configure at least one memory of a mobile terminal into an application-level cache with a locked region and a floating region; and
cause, at least in part, actions that result in caching, into each of the locked region and the floating region, of data items that are anticipated to be requested via an application of the mobile terminal,
wherein the floating region is attached to the locked region when the data items cached in the floating region are sequentially or directly ordered from the data items cached in the locked region, and the floating region is detached from the locked region when the data items cached in the floating region are no longer sequentially or directly ordered from the data items cached in the locked region so that there is a gap between the locked region and the floating region.

9. An apparatus of claim 8, wherein the cached data items are one or more parts of a set of ordered data items that are received from a server.

10. An apparatus of claim 9, wherein the apparatus is further caused to:
mark a position in the set of ordered data items, wherein the position corresponds to a particular one of the data items cached in the floating region; and
retrieve data items relative to the marked position in the set of ordered data items for caching in the floating region.

11. An apparatus of claim 10, wherein the apparatus is further caused to:
cause, at least in part, actions that result in reception of one or more unique keys from the server, wherein each of the one or more unique keys corresponds to a respective address of one of the data items at the server; and
map each of the one or more unique keys to a respective item index in either the locked region or the floating region.

12. An apparatus of claim 11, wherein the apparatus is further caused to:
cause, at least in part, actions that result in reception of a request for a data item, the request including a corresponding unique key;
obtain an item index mapped to the unique key included in the request;
retrieve a cached data item corresponding to the item index; and
cause, at least in part, actions that result in transmission of the retrieved data item in reply to the request.

13. An apparatus of claim 9, wherein the apparatus is further caused to:
partition the cache into one or more cache groups, wherein each of the one or more cache groups contains a fixed number of slots; and
cause, at least in part, actions that result in caching, into each of the slots, of one group of the set of ordered data items that is anticipated to be requested via the application.

14. An apparatus of claim 13, wherein the apparatus is further caused to:
when each of the fast memory and the persistent storage are full, replace one of the cached groups of the set of ordered data items with a new group; and
move slot identifiers corresponding to remaining ones of the cached groups without physically moving the cached groups within either the fast memory or the persistent storage.

15. A non-transitory computer-readable storage medium carrying one or more sequences of one or more instructions which, when executed by one or more processors, cause an apparatus to at least perform the following steps:
configuring at least one memory of a mobile terminal into an application-level cache with a locked region and a floating region; and
causing, at least in part, actions that result in caching, into each of the locked region and the floating region, of data items that are anticipated to be requested via an application of the mobile terminal,
wherein the floating region is attached to the locked region when the data items cached in the floating region are sequentially or directly ordered from the data items cached in the locked region, and the floating region is detached from the locked region when the data items cached in the floating region are no longer sequentially or directly ordered from the data items cached in the locked region so that there is a gap between the locked region and the floating region.

16. A non-transitory computer-readable storage medium of claim 15, wherein the cached data items are one or more parts of a set of ordered data items that are received from a server.

17. A non-transitory computer-readable storage medium of claim 16, wherein the apparatus is caused to further perform:
    marking a position in the set of ordered data items, wherein the position corresponds to a particular one of the data items cached in the floating region; and
    retrieving data items relative to the marked position in the set of ordered data items for caching in the floating region.

18. A non-transitory computer-readable storage medium of claim 17, wherein the apparatus is caused to further perform:
    causing, at least in part, actions that result in reception of one or more unique keys from the server, wherein each of the one or more unique keys corresponds to a respective address of one of the data items at the server; and
    mapping each of the one or more unique keys to a respective item index in either the locked region or the floating region.

19. A non-transitory computer-readable storage medium of claim 18, wherein the apparatus is caused to further perform:
    causing, at least in part, actions that result in reception of a request for a data item, the request including a corresponding unique key;
    obtaining an item index mapped to the unique key included in the request;
    retrieving a cached data item corresponding to the item index; and
    causing, at least in part, actions that result in transmission of the retrieved data item in reply to the request.

20. A non-transitory computer-readable storage medium of claim 16, wherein the apparatus is caused to further perform:
    partitioning the cache into one or more cache groups, wherein each of the one or more cache groups contains a fixed number of slots; and
    causing, at least in part, actions that result in caching, into each of the slots, of one group of the set of ordered data items that is anticipated to be requested via the application.

* * * * *